(12) United States Patent
Rosay et al.

(10) Patent No.: US 6,871,269 B2
(45) Date of Patent: Mar. 22, 2005

(54) DATA PROCESSING SYSTEM AND A METHOD OF DISTRIBUTING ACCESSES TO MEMORIES

(75) Inventors: Arnaud Sebastien Christophe Rosay, Le Mans (FR); Jean-Michel Ortion, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 345 days.

(21) Appl. No.: 10/142,621

(22) Filed: May 9, 2002

(65) Prior Publication Data

US 2003/0028732 A1 Feb. 6, 2003

(30) Foreign Application Priority Data

May 10, 2001 (FR) .............................................. 01 06198

(51) Int. Cl.⁷ .............................................. G06F 12/00
(52) U.S. Cl. ........................... 711/154; 711/5; 711/105; 711/156; 713/300; 713/320; 713/323; 365/226; 365/227; 365/228; 365/229
(58) Field of Search ............................. 711/5, 105, 154, 711/156; 713/300, 320; 365/226, 227, 287, 228, 229

(56) References Cited

U.S. PATENT DOCUMENTS

| | | | |
|---|---|---|---|
| 6,219,796 B1 * | 4/2001 | Bartley | 713/320 |
| 6,330,639 B1 * | 12/2001 | Fanning et al. | 711/106 |
| 6,466,508 B1 * | 10/2002 | Miyawaki et al. | 365/230.03 |
| 6,523,089 B2 * | 2/2003 | Tsern et al. | 711/118 |
| 6,734,802 B2 * | 5/2004 | Halleck et al. | 340/669 |
| 6,804,152 B2 * | 10/2004 | Matsubara et al. | 365/185.28 |
| 2003/0126353 A1 * | 7/2003 | Satoh et al. | 711/100 |

FOREIGN PATENT DOCUMENTS

WO     WO9512854     5/1995     ............ G06F/13/28

OTHER PUBLICATIONS

"30.0 Volt–only Page Mode Flash Memory Technology" Technology Background; AMD; pp. 1–7.

* cited by examiner

Primary Examiner—Donald Sparks
Assistant Examiner—Ngoc V Dinh
(74) Attorney, Agent, or Firm—Jack D. Slobod

(57) ABSTRACT

The present invention relates to a data processing system comprising a processor (100), at least one data memory (132), at least one program memory (134) and a main bus (110), common to the data and program memories and connecting these memories to the processor, characterized in that at least one of the memories has a rapid-access mode and in that the device also comprises a distribution interface (120) between the main bus (110) and the memories in order to alternately put in communication, by means of the main bus, one from among the data memory and the program memory with the processor, in a so-called active-access mode, and to keep the other memory in a so-called passive-access mode allowing subsequent rapid access.

13 Claims, 1 Drawing Sheet

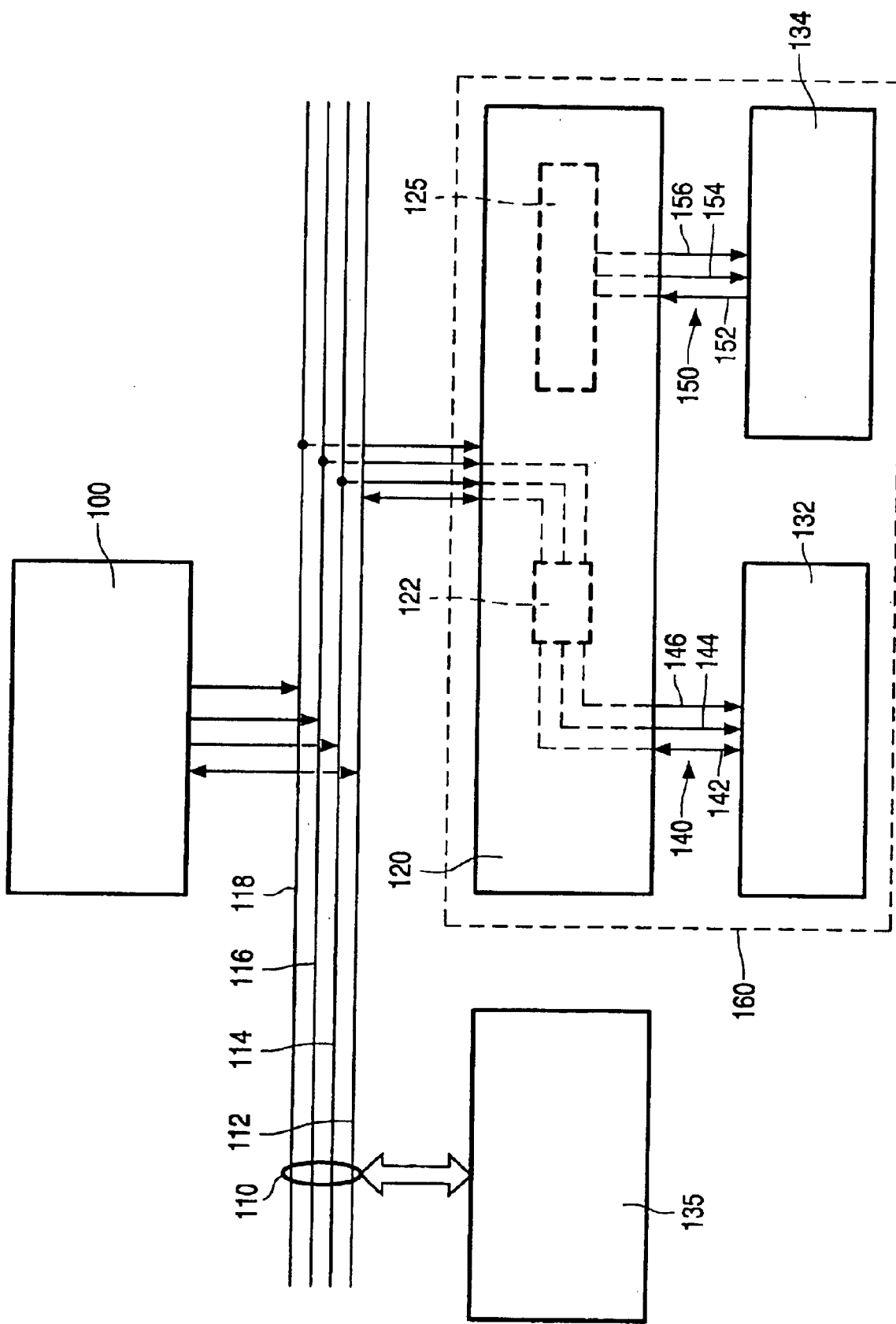

DATA PROCESSING SYSTEM AND A METHOD OF DISTRIBUTING ACCESSES TO MEMORIES

FIELD OF THE INVENTION

The present invention relates to a data processing system comprising a processor, and a method of distributing memories for the processor. The invention finds applications in a fairly wide range of products equipped with an integrated processor. These products relate particularly to portable equipment such as microcomputers, data or image presentation devices, and cellular telephones. In more general terms, the invention has advantages for all data processing equipment supplied from a self-contained energy source, such as a battery or electrical accumulator.

BACKGROUND OF THE INVENTION

Data processing systems including a processor, a data memory and a program memory have for the most part an architecture complying with one of two main architecture models.

The first architecture model is known as "Harvard". The processing systems complying with this architecture generally have a first bus for data exchange between the processor and a program memory and a second bus, different from the first one, for the exchange of data between the processor and a data memory.

The second architecture model, with which the data processing system of the invention complies, is known as "von Neumann". In accordance with this architecture, a common bus is shared by the data memory and the program memory for the exchange of information with the processor. This means that program (code) instructions of the program memory and processing data of the data memory cannot be conveyed concomitantly by the common bus.

Whatever the architecture adopted for the data processing system, the performance of the system, in terms of processing speed, can generally be improved by increasing the operating frequency of the processor.

The data processing speed is, however, not limited solely by the operating frequency of the processor but also by the time necessary for reading the instructions and the data necessary for the processing in the program or data memories. The time necessary for reading or writing a data item or an instruction in a memory can be reduced by increasing the electrical voltage controlling the memories.

The increase in the operating frequency of the processor and the voltage of the memories results in an increased electric power consumption and a higher heat dissipation. These effects, possibly acceptable for fixed installations, are particularly harmful for embedded applications and in particular for portable equipment supplied with power by battery or accumulator.

In order to reduce slowness in processing related to the memory reading (or writing) time, also known as access time, particular types of memory have been designed. These memories are referred to in the remainder of the text as rapid-access memories. These are, for example, memories of the "burst" type and memories of the "page" type. With these memories, when a series of data or instructions is to be read, the reading of the first data item or instruction in the series takes place according to a slow-access mode, referred to as "initial access", and the following data or instructions are read in rapid-access mode with reduced reading time.

By way of illustration, for a memory of the burst type, the initial access, which is not sequential, requires an access time of around 65 nsec, whereas the subsequent rapid accesses, which are sequential, require only an individual access time of 18 nsec.

In an architecture of the "von Neumann" type as mentioned above, the processor reads (or possibly records) data or instructions selectively or in alternation in the one of the data or program memories, and then in the other one of these memories. In the remainder of the text, the state of the memory in communication with the processor is referred to as "active". Its state is termed "inactive" when the memory is not in communication with the processor. Each change of a memory from the so-called inactive state to the so-called active state results in a first slow access: this is the initial access. As indicated above, the subsequent data read in the same memory before it returns to the inactive state are obtained in rapid access mode. Subsequent data means data which are stored following a first data item in a burst memory or which are stored in the same page of a page memory.

An illustration is given below of the functioning of a particular processor in a "von Neumann" architecture. This is a reduced instruction set processor (RISC) of the ARM7 type. This processor is capable of performing a certain number of tasks, among which there are in particular:

data movement,
flow control in the execution of a program),
arithmetic operations (addition, subtraction),
logic operations (AND, OR, NAND, NOR).

The tasks are executed mainly in three steps corresponding to three execution levels of the processor (pipe-line). These three steps are the reading of an instruction, the decoding thereof, and the actual execution thereof. The steps can be accompanied by data reading or writing.

Table I below summarizes these steps in a series of tasks to be performed, given purely by way of example. In this table, a succession of tasks are indicated, and the steps of execution thereof. The steps are designated "F" (fetch) for the reading of an instruction in the program memory, "D" for the decoding of an instruction, "E" for its execution, "A" designates the reading of data in the data memory. The boxes in the table marked with an "X" correspond to a wait related to the reading of a data item in the data memory.

TABLE 1

| Tasks | Steps | | | | | | | | | | | | |
|---|---|---|---|---|---|---|---|---|---|---|---|---|---|
| 1 Data movement | F | D | E | A | | | | | | | | | |
| 2 Logic operation | | F | D | X | E | | | | | | | | |
| 3 Data movement | | | F | X | D | E | A | | | | | | |
| 4 Arithmetic operation | | | | | F | D | X | E | | | | | |
| 5 Flow control | | | | | | F | X | D | E | | | | |
| 6 Data movement | | | | | | | F | D | X | X | | | |
| 7 Arithmetic operation | | | | | | | | F | X | X | | | |
| 8 Data movement | | | | | | | | | F | D | E | | |
| 9 Arithmetic operation | | | | | | | | | | F | D | | |
| 10 Data movement | | | | | | | | | | | | F | |
| | NS | S | S | NS | NS | S | NS | NS | S | NS | NS | S | |

Table I, whose chronological reading goes from left to right, also indicates, in its last line, the sequential (S) or non-sequential (NS) character of the steps, in the case where the memories are of the burst type.

As indicated above, the "F" boxes in Table I correspond to a reading in the program memory while the "A" boxes correspond to a reading in the data memory. Thus, during each reading "A" in the data memory, the program memory goes into the so-called inactive state so that the following step "F" is performed after an initial non-sequential access of longer duration (65 nsec). The next reading "A" in the data memory is also performed after an initial non-sequential access since a reading "F" in the program memory has occurred in the meantime. This appears in particular on lines 1 to 5 of Table I. Finally, each reading of a data item in the data memory results in two non-sequential initial accesses and in the loss of one processing cycle. In Table I each processing cycle corresponds to one step, that is to say one box in the direction of the rows.

When a flow command is executed, which corresponds to the last box on line 5 in the table, the reading of the following data in the program memory takes place at an address which does not follow the addresses of the instructions previously read in this same memory. This therefore entails a non-sequential access of the initial type to the program memory. In addition, the decoding and the execution of the program instructions still read following the addresses of the previous instructions, before the execution of the flow command, must be inhibited or at the very least are unnecessary, since they do not take the flow command into account. These steps are also marked with an "X" in lines 6 and 7 of the table.

Finally, it may be noted that, for memories of the burst type, there is a maximum length of words able to be read successively with rapid access (18 nsec). At the end of this number, which is for example 32, a new slower initial access (65 nsec) must be effected.

It is possible to calculate the average time necessary for executing a program involving 100 "F" steps, that is to say the reading of 100 instructions. This calculation is based on the functioning indicated by Table I and on the data in Table II. Table II indicates the statistical proportion of the various tasks mentioned above in the execution of a program.

TABLE II

| Data movement | 43% |
|---|---|
| Flow control | 23% |
| Arithmetic operation | 15% |
| Comparison | 13% |
| Logic operations | 5% |
| Others | 1% |

Considering the above data, the reading of 100 program instructions requires 143 cycles, that is to say 143 execution steps. Among these, there are 43 non-sequential (initial) accesses for the data movement of the data memory, 43 subsequent non-sequential (initial) cycles for the data movement of the program memory, 23 non-sequential (initial) cycles following flows, and 34 sequential (rapid) cycles for other instructions.

Considering also that the frequency of the processor is sufficient not to slow down the access time to the memory, and that the access times are respectively 65 nsec for the initial non-sequential accesses and 12 nsec for the rapid sequential accesses, the total duration of the execution of the 100 instructions is 7697 nsec.

This calculation corresponds to the use of a memory of the burst type. By way of comparison, by replacing the burst memory with a conventional memory, that is to say a memory for which all the accesses would be slow (65 nsec), the same operations would require a total period of 9295 nsec.

Finally, the increase in the performance of a data processing system with a "von Neumann" architecture is only 17% by replacing the traditional memories with memories of the burst type. A substantially identical finding can be made by replacing the traditional memories with memories of the page type.

To supplement the disclosure of the prior art reference can be made to documents (1), (2) and (3), whose references will be given at the end of the description. These documents concern the von Neumann architecture, and memories of the burst and page type.

SUMMARY OF THE INVENTION

The purpose of the invention is to propose a data processing system having improved performance and avoiding the limitations of the devices disclosed above to a large extent.

One aim of the invention is also to propose a powerful data processing system with a low power consumption so that it can be integrated into embedded applications and in particular portable equipment.

One aim of the invention is also to optimize the use of the characteristics of rapid-access memories, such as memories of the page or burst type, by avoiding multiplying the initial accesses in favor of rapid accesses.

Another aim of the invention is to propose a method of distributing accesses to data memories or program memories, making it possible to make better use of data processing systems with a von Neumann architecture.

To achieve these aims, the object of the invention is more precisely a data processing system comprising a processor, at least one data memory, at least one program memory, and a main bus, common to the data program memories and connecting these memories to the processor.

In accordance with the invention, at least one of the memories has a rapid-access mode. In addition, the device comprises a distribution interface connected between the main bus and the memories, to alternately put in communication, through the main bus, one from among the data memory and the program memory with the processor, in a so-called active access mode, and for keeping the other memory in a so-called passive access mode and allowing subsequent rapid access.

It is considered that the processing system has at least one data memory and at least one program memory, when it is provided with one or more memories or memory spaces allocated to the storage of processing data, and one or more memories or memory spaces allocated to the storage of codes or instructions for the execution of a program. However, in the remainder of the disclosure, it is considered, for reasons of simplification, that only one data memory and only one program memory are connected to a processor by means of a common main bus.

It is also necessary to state that the common main bus is not necessarily a single bus. The bus can effectively be formed from a cluster of several buses allocated to the transmission of different signals such as data signals (or instructions), address signals and control signals.

On the other hand, as the general architecture is of the "von Neumann" type, the common bus, single or multiple, does not make it possible to concomitantly transmit processing data and data corresponding to program instructions (code).

Finally, it is considered that a memory is of the rapid-access type if it makes it possible to exchange data (or instructions) following a relatively slow initial access, with access times which are reduced compared with that of the initial access. Rapid-access memories are, for example, memories such as the "burst" or "page" memories already mentioned in the introductory part of the text. In the processing system at least one of the memories, for example the program memory, is of the rapid-access type. However, it is preferable for all the memories to be this.

By means of the distribution interface, the rapid-access memory which is not in communication with the processor does not return to an inactive state which would require a slow initial access during a next movement of data (or instructions) but is kept in the passive access mode which makes it possible subsequently to resume a movement of data (or instructions) with rapid access rather than a slow initial access.

Data movement means the reading or writing of data or instructions in the data memory or program memory.

Keeping one of the memories in the state known as passive access consists mainly of "freezing" the signals which are applied to it or at the very least applying to this memory a logic control state which prevents its passage to the inactive state.

Thus, according to a particular embodiment of the distribution interface, this can include a memory for preserving the logic state of a signal applied to a memory at the time of its change from an active access mode when it is in communication with the processor, to the passive access mode.

The memory which is in communication with the processor functions according to the active access mode. For exchanging data (or instructions) between this memory and the processor, the distribution interface can comprise copying means for transferring signals between the main bus and one from among a first secondary bus connecting the interface to the data memory and a second secondary bus connecting the interface to the program memory.

In order to effect a selection between the active or passive access modes of the memories, it is possible to take into account various signals coming from the processor. For example, an address signal for reading data can be taken into account for determining whether the address corresponds to the data memory or to the program memory. The memory which is suitable for the address can then be put in communication with the bus in the active access mode, while the other memory is put in a state corresponding to the passive access mode.

Another possibility for achieving the distribution of the memories consists of taking account of a signal conveyed by an access (control) indication bus of the main bus. This signal indicates in particular whether a data transfer concerns processing data of the data memory or instructions of the program memory. In this case, the distribution interface is sensitive to a first logic state of a signal of the access indication bus, in which the program memory is put in an active-access mode and the data memory in a passive-access mode, and to a second logic state of the signal conveyed by the access indication bus in which the program memory is in a passive-access mode and the data memory is in an active-access state.

The whole of the data processing system, that is to say the processor, the bus and the data and program memories, can be integrated in one and the same integrated circuit aimed at a specific application (ASIC). Such a circuit can find a place in a portable telephone for example.

According to another possibility, the memories and the distribution interface can be integrated in one and the same circuit or provided in the same can, while the processor is integrated in a distinct circuit or provided in a distinct can.

This second possibility makes it possible in particular to replace the traditional memory equipping an existing system with a can with burst or flash memories, equipped with the distribution interface, in accordance with the invention.

The invention also concerns a method of distributing access to a data memory and a program memory, at least one of which has a rapid access mode.

According to this method, and in accordance with the above description, one of the memories is selectively and in alternation put in communication, by means of a common bus, with a processor, in a so-called active addressing mode whereas the second memory is kept in a so-called passive invariable standby addressing mode. As mentioned above, it is possible, in the passive addressing mode, to apply to one of the memories an invariable signal preventing initial access distinct from the rapid access when the memory subsequently goes into active addressing mode.

BRIEF DESCRIPTION OF THE DRAWINGS

The invention will be further described with reference to examples of embodiment shown in the drawing to which, however, the invention is not restricted. The accompanying FIGURE shows a data processing system in accordance with the invention.

DESCRIPTION OF PREFERRED EMBODIMENTS

The system comprises a processor 100, a main bus 110, a distribution interface 120, a data memory 132 and a program memory 134. The data memory 132 and the program memory 134 are of the rapid-access type. In this example, the distribution interface 120 is connected to the data memory 132 and to the program memory 134 by means respectively of first and second secondary buses 140 and 150.

The processor 100 is, for example, a reduced instruction set processor (RISC) of the R3000 (MIPS) or ARM7 type, and exchanges various signals with the main bus 110.

Among these signals are the data (or instruction) signals (CPU Data), the address signals (CPU Address) which indicate at which address a data item (or instruction) is to be read or written, the control signals (CPU Control) which determine whether a data item is to be read or written, and finally instruction read signals (Opcode fetch) which specify whether a data item (or instruction) is to be read in the data memory or in the program memory. The latter signal can also be deduced from the address signals.

The data signals (or instructions) can be sent from or to the processor. The other signals, such as the control signals, are sent by the processor to the memories.

Each type of signal mentioned above is transmitted on a separate bus, indicated respectively by the references 112, 114, 116, 118 in the figure. All these buses form part of the main bus 110 and can be considered to be various channels of the main bus.

The distribution interface 120 comprises copying means 122 depicted highly schematically in broken lines. These copy the data from the main bus to a first secondary bus 140, and vice-versa, so as to put one of the memories in communication with the main bus. In the figure this is the data memory 132. The first secondary bus 140 comprises a data bus 142, put in communication with the data bus 112 of the main bus 110, an address bus 144 put in communication with the address bus 114 of the main bus 110, and a control (read/write) bus 146 put in communication with the control bus 116 of the main bus. The last bus 118 of the main bus, which carries the instruction reading signals, is not copied to the secondary bus or to the memory 132. The signals of this access indication bus are in fact used in the distribution interface 120 in order to determine which of the memories is in active-access mode, that is to say to which the copying means 122 apply. By way of example, for a logic 1 state of the signal of this bus, the program memory is in active mode and the data memory is in passive mode. These roles are reversed for the logic 0 state.

A second secondary bus 150 connects the interface 120 to the program memory 134 which, in the example illustrated, is in a so-called passive-access mode.

The second bus is also formed by several buses referenced 152, 154 and 156.

The functions of this bus are identical to the buses 142, 144 and 146 already mentioned. It should be noted however that the data (instruction) bus 152 may possibly serve only for reading instructions rather than for writing them, according to the type of program memory used.

A memory 125 of the interface 120, connected to the program memory by means of the second secondary bus 150, keeps the last logic state of the signals applied to the program memory before the latter goes from an active-access mode to the passive mode. In other words, the memory 125 causes a "freezing" of these signals up to the next active access, at which the copying means will put the buses 112, 114 and 116 of the main bus 110 in communication with the buses 152, 154 and 156 of the second secondary bus. The freezing of the signals can also relate to a clock signal applied to the memories when these have a sequential access mode (burst memories). The "freezing" of the signal has the effect of preventing a slow initial access during the next reading of writing of the data (instructions) in a memory.

A broken line 160 indicates in summary a self-contained can able to contain the memories 132, 134 and the interface 120.

In addition, the reference 135 designates peripheral equipment or connection interfaces able to be connected to the main bus 110.

Documents Cited

1) WO95/12854

2) 3.0 Volt-only Page Mode Flash Memory Technology AMD (www.amd.com)

3) 3.0 Volt-only Burst Mode Flash Memory Technology AMD (www.amd.com)

What is claimed is:

1. A data processing system comprising a processor (100), at least one data memory (132), at least one program memory (134) and a main bus (110), common to the data and program memories and connecting these memories to the processor, characterized in that at least one of the memories has a rapid-access mode and in that the device also comprises a distribution interface (120) between the main bus (110) and the memories in order to alternately put in communication, by means of the main bus, one from among the data memory and the program memory with the processor, in a so-called active-access mode, and to keep the other memory in a so-called passive access mode allowing subsequent rapid access.

2. A system as claimed in claim 1, in which the distribution interface comprises copying means for transferring signals between the main bus (110) and one from among a first secondary bus (140) connecting the interface to the data memory and a second secondary bus (150) connecting the interface to the program memory.

3. A system as claimed in claim 1, in which the interface comprises a memory (125) for preserving the logic state of a signal applied to a memory at the time of its change from an active access mode when it is in communication with the processor, to the passive access mode.

4. A system as claimed in claim 1, in which the main bus comprises a data bus (112), an address bus (114), a control bus (116) and an access indication bus (118).

5. A system as claimed in claim 3, in which the distribution interface (120) is sensitive to a first logic state of a signal conveyed by the access indication bus (118), in which the program memory is put in an active access mode and the data memory in a passive access mode, and to a second logic state of the signal conveyed by the access indication bus in which the program memory is put in a passive access mode and the data memory in an active access mode.

6. A system as claimed in claim 1, in which at least one from among the data and program memories comprises a memory of the burst memory type or page memory type.

7. A system as claimed in claim 1, in which the processor, the memories (132, 134) and the distribution interface (120) form part of the same integrated circuit.

8. A system as claimed in claim 1, in which the memories and the distribution interface form part of an integrated circuit, distinct from an integrated circuit comprising the processor.

9. A system according to claim 1, in which the distribution interface and the processor form part of an integrated circuit distinct from the memory components.

10. A can (160) comprising a data memory (132), a program memory (134) and a distribution interface (120), and able to be connected to a processor, by means of a bus, in order to form a system in accordance with claim 1.

11. A portable telephone comprising a data processing system as claimed in claim 1.

12. A method of distributing access to a data memory (132) and a program memory (134), at least one of which has a rapid access mode, and a distribution interface (120) between the main bus (110) and one of the memories which is selectively and in alternation put in communication, by means of a common bus, with a processor (100), in a so-called active addressing mode whereas the second memory is kept in a so-called passive invariable standby addressing mode.

13. A method as claimed in claim 11, in which, during the passive addressing mode, there is applied to one of the memories an invariable signal preventing initial access distinct from rapid access when the memory goes into active addressing mode.

* * * * *